Patented Oct. 5, 1954

2,691,022

UNITED STATES PATENT OFFICE 2,691,022

HALOMETHYL DERIVATIVES OF THE ACRIDONE AND THIOXANTHONE SERIES

David I. Randall and Tellis A. Martin, Easton, Pa., assignors to General Aniline & Film Corporation, New York, N. Y., a corporation of Delaware No Drawing. Application October 30, 1950, Serial No. 193,026

5 Claims. (Cl. 260—277)

This invention relates to vat dyes and vat dye intermediates of the acridone and thioxanthone series. More particularly it relates to the clormethylation products of the anthraquinonyl derivatives of acridone and thioxanthone.

The anthraquinonyl vat dyes of the acridone and thioxanthone series may be represented by the formula:

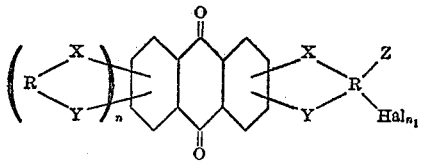

wherein R is a member of the class consisting of phenyl and naphthyl radicals; X is a member of the class consisting of (—NH—) and (—S—); Y is a carbonyl radical (—CO—); Z is a member of the class consisting of alkyl such as methyl and aryl such as phenyl; Hal means halogen; and $n$ and $n_1$ are members of the class consisting of 0 and 1. X and Y are attached to adjacent C atoms of the anthraquinonyl radical.

The vat dyes of the above class are insoluble and are not substantive to fabrics as such but form a valuable class of dyes due to their ability to pass into solution in a reduced or leuco form which may be applied to the fabric. The insoluble dye is treated with reducing agents which convert the insoluble dye to a phenolic form by reduction of one or more of the keto groups of the anthraquinonyl-acridone, -diacridone, -thioxanthone, or -dithioxanthone compounds. Alkaline solutions of the reduced or leuco compounds possess great affinity for the fiber and may be easily reoxidized by known methods to reform the insoluble dye on the fiber.

It has now been discovered that these anthraquinonyl-acridone, -diacridone, -thioxanthone and -dithioxanthone dyes may be converted to their halomethyl and particularly chloromethyl derivatives forming an extremely valuable new class of vat dyes and vat dye intermediates. The halomethyl derivatives may be employed as such in the vat dyeing of fabrics or may be employed as intermediates and be converted to highly colored soluble dyes by reaction with tertiary amines such as trimethylamine, pyridine, picoline, isoquinoline, quinoline, diethylamino ethyl alcohol, triethy amine and benzyldimethylamine which produce the quaternary ammonium bases and by reaction with thioureas such as thiourea, 1-allyl-; 1-methyl-; 1-phenyl-; 1,3-dimethyl-; 1,3-ethylene-; 1,1,3-trimethyl-; and 1,1,3,5-tetramethyl thiourea which produce the isothiouronium salts. Such conversion products may be used to dye cotton directly from aqueous solution. When the chloromethylated products are fused in alkali the corresponding methyl compounds are produced by reduction of the chloromethyl groups.

Upon vatting the chloromethyl acridones or thioxanthones the corresponding methyl compounds result. These methyl derivatives are considerably brighter on cotton than the methyl derivatives synthetized by caustic fusion of the chloromethylated acridones and thioxanthones. The developed colors are from yellow to violet in shade and have excellent fastness properties. They are brighter than the starting materials.

The chloromethyl derivatives of the anthraquinonyl-acridone, -diacridone, -thioxanthone and -dithioxanthone compounds are produced by dissolving the anthraquinonyl compound in 96 to 100% sulfuric acid which acts as a catalyst and solvent and introducing dichloro-dimethyl ether at room temperature. This mixture may be allowed to stand for several days with or without stirring or may be heated up to 80° C. and stirred for several hours. The reaction product is recovered by pouring the mixture into ice water, filtering, washing and slurrying with dilute sodium bicarbonate. The chloromethylation may also be effected using aluminum chloride as the catalyst. According to this method the dichlorodimethyl ether is added to a pyridine aluminum chloride mixture and the anthraquinonyl compound is then slowly added at from 55 to 60° C. The mixture is then heated for one hour at about 60° C. and the product recovered by pouring the reaction mixture into a mixture of ice water and hydrochloric acid, filtering and washing. The reaction may be represented by the following equation:

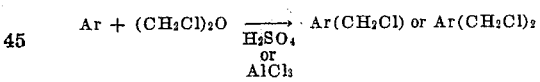

where Ar represents the acridone or thioxanthone dyestuff molecule. Monochloromethylation takes place on each acridone or thioxanthone member of the molecule, but polychloromethylation may result in some instances such as in the case of naphthyl acridone or phenyl acridone. The aryl moiety of the acridone or thioxanthone member may be substituted in the ortho and para position provided that either or both the 3' and 5' position (as in the case of anthraquinone-acridone)

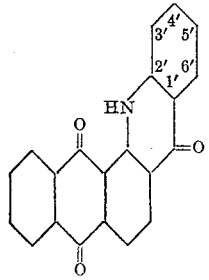

are unoccupied. Alkyl such as methyl and ethyl and halo such as chlorine and bromine substituents frequently aid in the chloromethylation reaction. Aryl groups such as phenyl and naphthyl may be present anywhere in the primed positions even though they block the normal entering positions of the aryl moiety itself since such aryl substituents will themselves receive the chlormethyl groups. However, where aryl substituents are present in the acridone or thioxanthone member care must be taken to prevent formation of polymeric products of the diphenylmethane type.

The chlormethylated products may be represented by the following formula:

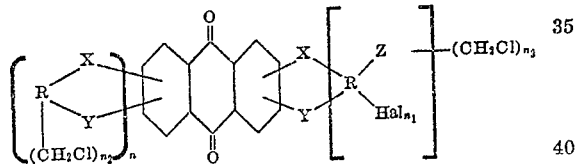

wherein R, X, Y, Z, Hal, $n$ and $n_1$ have the same meanings as above and $n_2$ is a whole number from 1 to 3 equal to the number of entering positions on R and/or Z.

The invention will be further described with respect to the following examples which are intended to be illustrative of the invention but not limitative. Unless otherwise stated the parts are by weight.

EXAMPLE 1

*Monochlormethyl anthraquinone-5'-methyl-1,2-acridone*

A mixture of 34 parts of anthraquinone-5'-methyl-1,2-acridone, 368 parts of 96% sulfuric acid and 33 parts of bischloromethyl ether is allowed to stand at room temperature for three days. On working up by pouring into ice water, filtering, washing free from acid and drying at 60° C., 37.4 parts of brick-red material was obtained. This product contains 9.2% of chlorine and is thus the monochloromethyl derivative. It has the following formula:

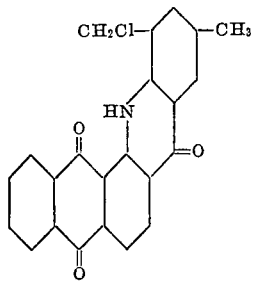

This product gives an orange vat which dyes cotton in pink shades of good fastness. The chlormethyl derivative of anthraquinone-3'-methyl-6'-chloroacridone is obtained in the same manner, also the 3'-bromo, 3'-methyl and 6'-chloro derivatives.

EXAMPLE 2

*Dichlormethyl anthraquinone diacridone*

22.1 parts of anthraquinone diacridone were dissolved in 552 parts of 96% sulfuric acid. The temperature was held 15 hours at 55° C. After working up the product as in Example 1, 26.2 parts of violet powder were obtained. The theory chlorine value for 2 chloromethyl groups having been introduced was 13.2%, found 16.7%. Its dyeings on cotton were violet shades of good fastness properties. When the reaction was run at lower temperatures of 40-50° C., brighter shades were obtained. At this temperature, -2 chloromethyl groups were introduced. The product has the formula:

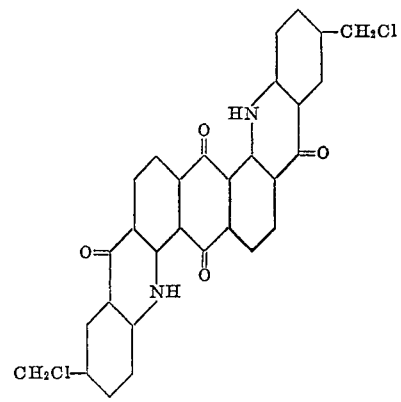

Anthraquinone -1,2 - acridone is monochloromethylated under the same conditions. A bluish pink shade of good fastness properties is obtained.

EXAMPLE 3

*Dichloromethyl anthraquinone 1,2-naphthylacridone*

To a stirred solution of 37.5 parts of anthraquinone-1,2-naphthylacridone and 368 parts of 96% sulfuric acid are added 33 parts of bischloromethyl ether. With continued stirring, the reaction is allowed to proceed at room temperature for three days. Pouring the reaction mixture into ice water, collecting the precipitated material on a filtering, washing repeatedly with water and then twice with ethanol, and drying at 60° C. yielded 37 parts of orange solid. Analysis for chlorine (found: 17.2%) indicates that this material is chiefly the dichloromethyl derivative.

A vat of this product dyes cotton in fast reddish shades. It has the following formula:

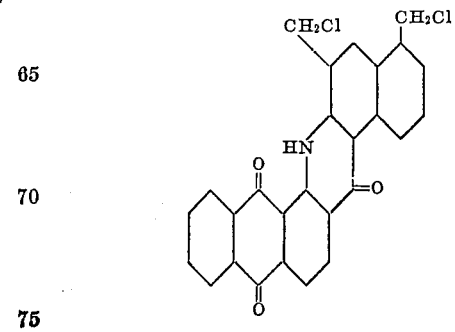

By increasing the temperature to 40° C. under similar conditions, a trichloromethyl derivative is obtained.

Corresponding chlormethyl derivatives of anthraquinone-3'-phenyl-1,2-acridone are similarly obtained.

EXAMPLE 4

*Monochlormethyl anthroquinone 1,2-thioxanthone*

A mixture of 24.2 parts of thioxanthone, 368 parts of 100% sulfuric acid and 22 parts of bichloromethyl ether is heated at 78–80° C. for fifteen hours. The reaction mixture is poured into 500 parts of ice water, filtered, washed a number of times with water. After slurrying the filter cake with dilute sodium bicarbonate, the mixture is refiltered, washed repeatedly with water and dried at 70° C. for three days. This gave 28 parts of yellow product, which contains 10% of chlorine and consists essentially of monochloromethyl derivative. The product has the formula:

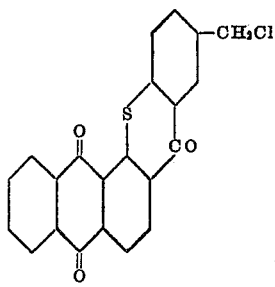

In addition to the above compound, other anthraquinone-1,2-thioxanthone may be chloromethylated by the same procedure such as the 3', 5' or 6'-methyl, the 3', 6'-dichloro, the 3'-chloro-6'-methyl, the 3'-bromo, the 4' or 5'-phenyl derivatives, the thioxanthone analogous to the acridone of Example 4, and the anthraquinone-2,1- and 2,3-thioxanthones.

EXAMPLE 5

*Dichlormethyl anthraquinone di-1,2,5,6-thioxanthone*

A mixture of 47.8 parts of anthraquinone di-1,2,5,6-thioxanthone, 460 parts of 100% sulfuric acid and 39 parts of bischloromethyl ether is heated at 78–80° C. with stirring for twenty hours. Pouring into 2000 parts of ice water, filtering, washing repeatedly with water, and drying at 60° C. gave 58 parts of brownish-red solid. This material contains 12% of chlorine and consists of the dichloromethyl derivative.

This new product dyes cotton in bright red shades of good fastness properties. It has the formula:

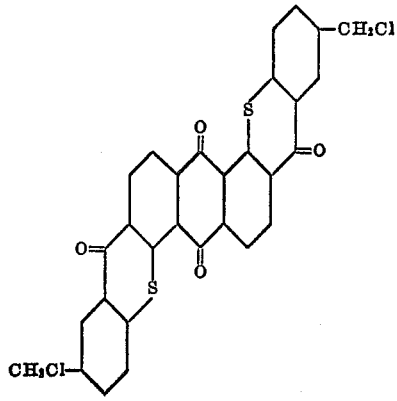

We claim:
1. The vat dye intermediates of the class consisting of those having the formula:

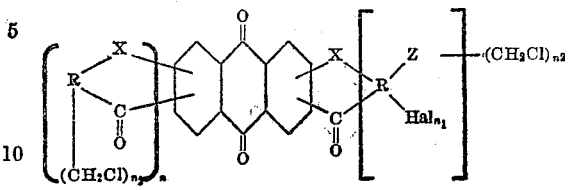

wherein R is a member of the class consisting of phenyl and naphthyl radicals; the X's are similar members of the class consisting of —NH— and —S—; Z is a member of the class consisting of lower alkyl and aryl groups of the benzene series; Hal means halogen; $n$ and $n_1$ are members of the class consisting of 0 and 1; $n_2$ is a whole number from 1 to 2 inclusive and X and the carbonyl group depicted therebelow are attached to adjacent C atoms of the anthraquinonyl and R radicals, and further when Z is lower alkyl the substituent —$CH_2Cl)_{n_2}$ associated with the grouping

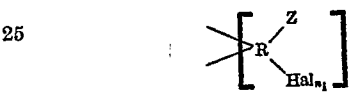

is attached directly to R in said latter grouping.

2. The vat dye intermediate having the formula:

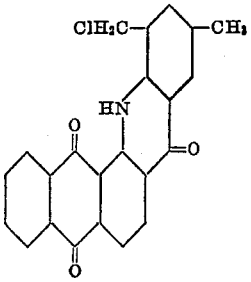

3. The vat dye intermediate having the formula:

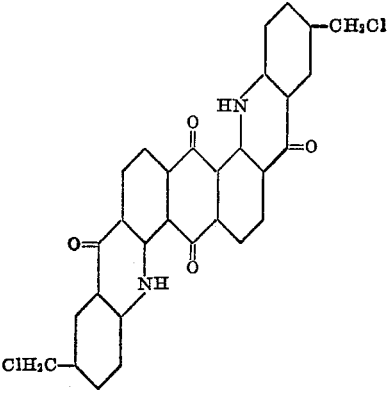

4. The vat dye intermediate having the formula:

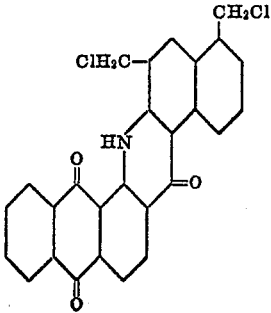

5. The vat dye intermediate having the formula:
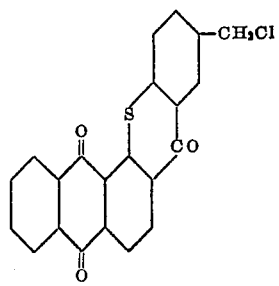
References Cited in the file of this patent
UNITED STATES PATENTS
| Number | Name | Date |
|---|---|---|
| 2,100,531 | Wuertz et al. | Nov. 30, 1937 |
| 2,100,532 | Wuertz et al. | Nov. 30, 1937 |
| 2,267,139 | Schilchenmaier et al. | Dec. 23, 1941 |
| 2,492,802 | Lecher et al. | Dec. 27, 1949 |